July 2, 1946. J. R. LYNCH Re 22,769

LUMINOUS ARTICLE AND METHOD

Original Filed Dec. 19, 1942

INVENTOR
John R. Lynch
BY Barlow & Barlow
ATTORNEYS

Reissued July 2, 1946

Re. 22,769

UNITED STATES PATENT OFFICE 22,769

LUMINOUS ARTICLE AND METHOD

John R. Lynch, Providence, R. I., assignor to E. P. Lynch, Inc., a corporation of Rhode Island Original No. 2,372,903, dated April 3, 1945, Serial No. 469,510, December 19, 1942. Application for reissue March 28, 1946, Serial No. 657,640

6 Claims. (Cl. 250—80)

This invention relates to luminous or phosphorescent material and the application thereof to an obverse surface.

Luminous material sometimes referred to as phosphorescent material although there may be no phosphorus present as it is available at the present time may be graded or classified as to certain characteristics that it may have by the brilliance or amount of impact on the eye and also as to the time during which it will remain observable after charging by exposure to light. Some luminous material which has a brilliant after-glow will be visible for a relatively short time (usually two hours or less) whereas other materials which are not as brilliant upon sudden darkness may be observed for a much longer time (usually from two to twelve hours). It is also well known that a lapse of time is necessary for the human eye to become dark adapted for visibility in the dark. In other words if the eyes are exposed to a bright light and the light is suddenly extinguished it may be several minutes before the eye will accustom itself to the dark so that one may see readily.

One of the objects of this invention is to provide a surface which will be readily visible immediately after the light is extinguished and also a surface which will be visible for a continued length of time after the light has been extinguished.

Another object of this invention is the provision of a luminescent surface with one area having relatively greater light impact on the eye from a luminescent standpoint than another immediately upon the extinguishing of light with the other area of the surface such that it will become prominent after a certain length of time.

Another object of the invention is to provide a surface which will be composed of material of different luminescent characteristics with the surface more visibly luminous than if the particles of these materials of different luminescent characteristics were physically mixed and their particles distributed over the same area.

With these and other objects in view, the invention consists of certain novel features of construction, as will be more fully described and particularly pointed out in the appended claims.

Figure 1:
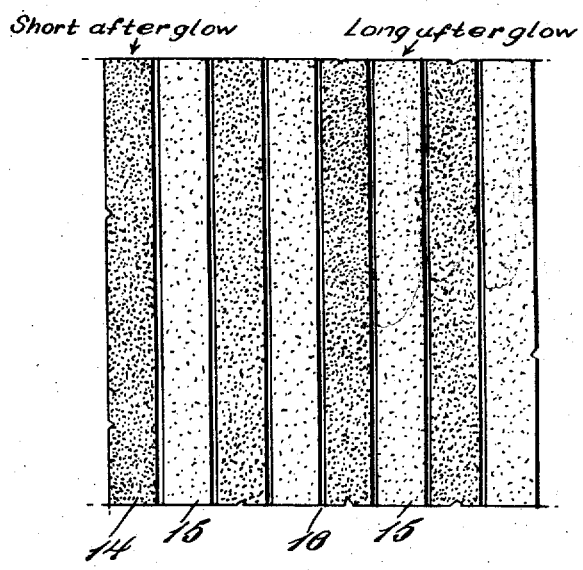
Fig. 1 illustrates a top plan view of a sheet of material which has been coated with luminescent material of different characteristics.
Figure 2:
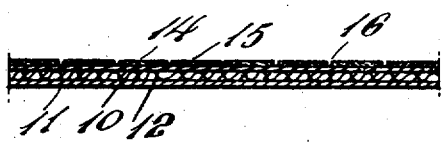
Fig. 2 is a section of the sheet material.

In proceeding with this invention I select a luminescent material which will have a brilliant immediate after-glow although rapidly diminishing in its intensity of impact on the eye for application to a surface and I select a material of less brilliant immediate afterglow but one which will last many hours for application to an area of the surface to be covered. The areas may be in the form of any desired pattern and as the materials are largely activated by light rays they will be used over a surface which has the property of good reflection for such rays.

With reference more specifically to the drawing I have chosen for illustrative purposes the application of these different luminescent materials to a strip of textile tape designated generally 10 which may be provided with some adhesive backing 11 and which will be treated with some material 12 which will be a good reflector of the activating rays of the luminous material, the ultraviolet rays being an important activator. Titanium dioxide is a good reflector although there may be other materials which will equally well reflect activating rays. This strip instead of being textile material may be paper with a good reflecting surface, the finish of which will be highly reflective of the activating rays. The same coating might be applied to the paper as is applied to the textile tape.

Upon a surface prepared as described I will deposit a layer of a luminescent material designated 14 which will have a short afterglow (usually two hours or less) and a luminescent material designated 15 which will have a long afterglow (usually from two to twelve hours). These coatings may be simultaneously applied by passing a strip beneath suitable reservoirs containing each of the materials with some sort of an applicator or scraper for causing an even deposit to be provided. A suitable space 16 may be provided between each of the strips 14 and 15 of the different luminescent materials.

The luminescent material with short afterglow designated 14 may be any one of a variety of well-known materials which will have such characteristics; for example zinc sulfide, magnesium sulfide, or barium sulfide, which are the better known commercially prominent materials at the present time.

The luminescent material which will have less brilliancy but a long afterglow may also comprise any one of a large number of materials of which the list may be several hundred in number. For an example, such better known materials are calcium sulfide, or strontium sulfide.

The luminescent pigments of one characteristic are mixed with a suitable vehicle for application which will bond them together and cause the bonded pigments to adhere to the surface on which they are applied and which vehicle may later partly evaporate to cause a set of the pigments on the surface, and the luminescent pigments of the other characteristic are similarly applied.

The two different luminescent materials may be arranged in any pattern and in such a manner that the particles of one kind remain together separate and distinct from the particles of the other kind even though the two are contiguous, whereby the portions of the pattern covered by the short afterglow have greater brilliance immediately upon extinguishing of the light when the eyes are less dark adapted so that they may be seen immediately whereas the area covered by the long afterglow luminescent material will have a less impact upon the eye immediately upon the light being extinguished but may be seen a few minutes after extinguishment when the eyes become dark adapted and will be visible a long period of time such for example as several hours. Thus one of these materials becomes progressively weaker on the eye as darkness takes place while the eye becomes progressively more conscious of the presence of the other luminescent material. At one point both appear to have the same brilliance. The use of the different materials with their particles physically separate give to each a greater brilliance than if the particles are physically mixed. This physical distinction of the particles which provides the better properties remains even though one material is superimposed on the other after dry.

Materials of this character are useful in the interior of ships to which some trouble may develop to the interior lighting system or for any use where the location of some object is to become apparent in the dark.

The definition adopted for "short" and "long" afterglow is that set forth in the statement by the National Bureau of Standards of Washington in a letter circular LC-678 of Jan. 24, 1942.

I claim:

1. An article of manufacture comprising a base presenting a surface, luminescent materials of relatively longer and shorter afterglow on said surface, the material of the longer afterglow presenting one surface area and the material of the shorter afterglow presenting a different surface area, said areas being each of substantial extent and each distinct and independent of the other.

2. An article of manufacture comprising a base presenting an obverse surface, luminescent materials of relatively long and short afterglow on said surface, the material of the long afterglow presenting one surface area and the material of the short afterglow presenting a different surface area, said areas being each of substantial extent and each distinct and independent of the other.

3. An article of manufacture comprising a base presenting a support, a material on one portion of the area of the obverse surface thereof being of one luminescent afterglow and a material on another portion of the area of the obverse surface being of a different luminescent afterglow, said areas being each of substantial extent and each distinct and independent of the other, said base having the property of highly reflecting the activating rays for the luminescent material.

4. The method of forming a luminescent surface which consists in applying to one area of a surface support only a material of a relatively short afterglow and applying to a different area of the surface only a material of a relatively long afterglow.

5. An article of manufacture comprising a base presenting a surface, luminescent materials of relatively longer and shorter afterglow on said surface with the particles of each material grouped together, certain of said surface areas having exposed on its outer surface the material of longer afterglow and other areas having exposed on its outer surface the material of shorter afterglow.

6. An article of manufacture comprising a base presenting a surface, luminescent materials of relatively longer and shorter afterglow on said surface with the particles of each material grouped together, the material of one afterglow presenting one surface area and the material of the other afterglow presenting a different surface area with the particles in each material each being grouped with its like particles to provide a clearly defined visible entity or whole.

JOHN R. LYNCH.